(12) United States Patent
Cricri et al.

(10) Patent No.: US 10,405,123 B2
(45) Date of Patent: Sep. 3, 2019

(54) METHODS AND APPARATUSES RELATING TO AN ESTIMATED POSITION OF AN AUDIO CAPTURE DEVICE

(71) Applicant: Nokia Technologies Oy, Espoo (FI)

(72) Inventors: Francesco Cricri, Tampere (FI); Jukka Saarinen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/621,243

(22) Filed: Jun. 13, 2017

(65) Prior Publication Data

US 2018/0007486 A1    Jan. 4, 2018

(30) Foreign Application Priority Data

Jun. 21, 2016    (GB) .................................. 1610802.9

(51) Int. Cl.
| | | |
|---|---|---|
| *H04S 7/00* | (2006.01) | |
| *G06F 3/01* | (2006.01) | |
| *H04R 1/32* | (2006.01) | |
| *H04R 5/027* | (2006.01) | |
| *G06F 3/16* | (2006.01) | |

(52) U.S. Cl.
CPC .............. *H04S 7/301* (2013.01); *G06F 3/011* (2013.01); *G06F 3/017* (2013.01); *G06F 3/165* (2013.01); *H04R 1/326* (2013.01); *H04R 5/027* (2013.01); *H04R 2420/07* (2013.01); *H04S 2400/11* (2013.01); *H04S 2400/15* (2013.01)

(58) Field of Classification Search
CPC .. H04S 2400/11; H04S 7/301; H04S 2400/15; H04R 2420/07; H04R 5/027; H04R 1/326; G06F 3/167; G06F 3/011; G06F 3/017
USPC .......................................................... 381/17
See application file for complete search history.

(56) References Cited

U.S. PATENT DOCUMENTS

2013/0101134 A1*  4/2013  Betts-Lacroix ........... H04S 7/30
                                                              381/80

FOREIGN PATENT DOCUMENTS

| EP | 2530957 A2 | 12/2012 |
|---|---|---|
| WO | 2012/120335 A1 | 9/2012 |
| WO | 2015/089236 A1 | 6/2015 |

OTHER PUBLICATIONS

"Bluetooth Core Specification Version 4.2", Specification of the Bluetooth system, Dec. 2, 2014, 2772 pages.
Search Report received for corresponding United Kingdom Patent Application No. 1610802.9, dated Nov. 21, 2016, 5 pages.

* cited by examiner

*Primary Examiner* — Paul Kim
(74) *Attorney, Agent, or Firm* — Alston & Bird LLP

(57) ABSTRACT

This specification describes a method comprising determining whether an estimated position of an audio capture device which captures audio data is within boundaries of a predetermined area, and in response to a determination that the estimated position is not within the boundaries of the predetermined area, associating the captured audio data with an adjusted position.

18 Claims, 10 Drawing Sheets

METHODS AND APPARATUSES RELATING TO AN ESTIMATED POSITION OF AN AUDIO CAPTURE DEVICE

FIELD

This specification relates generally to handling an estimated position of an audio capture device.

BACKGROUND

Production of virtual reality (VR) videos involves obtaining both visual and audio information relating to a scene being recorded. In addition, spatial audio mixing (SAM) can be used with positioning detection technology, such as High-Accuracy Indoor Positioning (HAIP) radio technology, being used for determining the position of actors or other audio sources in the captured scene. For example, the actors may wear a radio tag which is continuously tracked by an antenna generally co-located with the VR camera, one example of which is Nokia's OZO camera. Additionally, the actors may wear a close-up microphone (also known as a lavalier microphone) to capture close-up audio from the actor. SAM allows for rendering the close-up audio with correct spatial information.

SUMMARY

According to a first aspect, the specification describes a method comprising determining whether an estimated position of an audio capture device which captures audio data is within boundaries of a predetermined area, and, in response to a determination that the estimated position is not within the boundaries of the predetermined area, associating the captured audio data with an adjusted position.

The predetermined area may be an area within which the audio capture device is expected to move during audio capture. Where the area is defined in respect of a surface (e.g. a floor), being "within" the predetermined area may include being directly above (or below) the portion of the surface delimited by the boundaries of the predetermined area.

The adjusted position may be located within the boundaries of the predetermined area. In particular, the adjusted position may be located at the centre of the predetermined area, at a boundary of the predetermined area, or at a last estimated position within the predetermined area.

The method may further include causing visual detection to be enabled within the boundaries of the predetermined area and setting the adjusted position to correspond to a visually detected position of a body associated with the audio capture device. In response to a plurality of bodies being visually detected within the boundaries of the predetermined area, the adjusted position may be set to correspond to the visually detected position of a body which is determined to be closest to the estimated position.

The method may further include determining a distance between the estimated position and a boundary of the predetermined area, and setting the adjusted position according to the determined distance. In response to determining that the distance between the estimated position and the boundary of the predetermined area is less than a predetermined distance, the adjusted position may be set to be at the boundary of the predetermined area.

The captured audio data may be caused to be rendered by a spatial audio playback device from a rendering location corresponding to the adjusted position. The captured audio data may be rendered from a rendering area around the rendering location. The rendering area may correspond to the whole of the predetermined area, or an area surrounding the last estimated position within the predetermined area.

The method may also include obtaining the estimated position based on a location of a positioning tag associated with the audio capture device.

The method may further include setting the boundaries of the predetermined area. For example, this may include setting the boundaries of the predetermined area according to manual instructions input through a user interface. Alternatively, setting the boundaries of the predetermined area includes causing a gesture recognition device to detect one or more gestures of a body associated with the audio capture device, and
setting the boundaries of the predetermined area based on the one or more gestures of the body.

According to a second aspect, this specification describes apparatus configured to perform any method as described with reference to the first aspect.

In a third aspect, this specification describes computer-readable instructions which, when executed by computing apparatus, cause computing apparatus to perform any method as described with reference to the first aspect.

In a fourth aspect, this specification describes apparatus comprising at least one processor and at least one memory including computer program code, which when executed by the at least one processor, causes the apparatus to determine whether an estimated position of an audio capture device which captures audio data is within boundaries of a predetermined area; and in response to a determination that the estimated position is not within the boundaries of the predetermined area, associating the captured audio data with an adjusted position.

The adjusted position may be located within the boundaries of the predetermined area. In particular, the adjusted position may be at the centre of the predetermined area, at a boundary of the predetermined area, or at a last estimated position within the predetermined area.

In some examples, the computer program code, when executed by the at least one processor, may cause the apparatus to: cause visual detection to be enabled within the boundaries of the predetermined area, and to set the adjusted position to correspond to a visually detected position of a body associated with the audio capture device. In such examples, in response to a plurality of bodies being visually detected within the boundaries of the predetermined area, the adjusted position may be set to correspond to the visually detected position of a body which is determined to be closest to the estimated position.

In some examples, the computer program code, when executed by the at least one processor, may cause the apparatus to determine a distance between the estimated position and a boundary of the predetermined area, and to set the adjusted position according to the determined distance. In such examples, in response to determining that the distance between the estimated position and the boundary of the predetermined area is less than a predetermined distance, the adjusted position may be set to be at the boundary of the predetermined area.

In some examples, the computer program code, when executed by the at least one processor, may cause the apparatus to cause the captured audio data to be rendered by a spatial audio playback device from a rendering location corresponding to the adjusted position. The audio may be rendered from a rendering area around the rendering location. The rendering area may correspond to the whole of the predetermined area or an area surrounding the last estimated position within the predetermined area.

In some examples, the computer program code, when executed by the at least one processor, may cause the apparatus to obtain the estimated position based on a location of a positioning tag associated with the audio capture device.

In some examples, the computer program code, when executed by the at least one processor, may cause the apparatus to set the boundaries of the predetermined area. The boundaries of the predetermined area may be set according to manual instructions input through a user interface. Alternatively, the computer program code, when executed by the at least one processor, may cause the apparatus to cause a gesture recognition device to device to detect one or more gestures of a body associated with the audio capture device, and to set the boundaries of the predetermined area based on the one or more gestures of the body.

According to a fifth aspect, this specification describes a computer-readable medium having computer readable code stored thereon, the computer-readable code, when executed by at least one processor, cause performance of at least: determining whether an estimated position of an audio capture device which captures audio data is within boundaries of a predetermined area, and in response to a determination that the estimated position is not within the predetermined area, associating the captured audio data with an adjusted position. The computer-readable code stored on the medium of the fifth aspect may further cause performance of any of the operations described with reference to the method of the first aspect.

According to a sixth aspect, this specification describes apparatus comprising means for determining whether an estimated position of an audio capture device which captures audio data is within boundaries of a predetermined area, and in response to a determination that the estimated position is not within the predetermined area, associating the captured audio data with an adjusted position. The apparatus of the sixth aspect may further comprise means for causing performance of any of the operations described with reference to the method of the first aspect.

BRIEF DESCRIPTION OF THE FIGURES

For a more complete understanding of the methods, apparatuses and computer-readable instructions described herein, reference is now made to the following descriptions taken in connection with the accompanying drawings in which.

DETAILED DESCRIPTION

Figure 1:
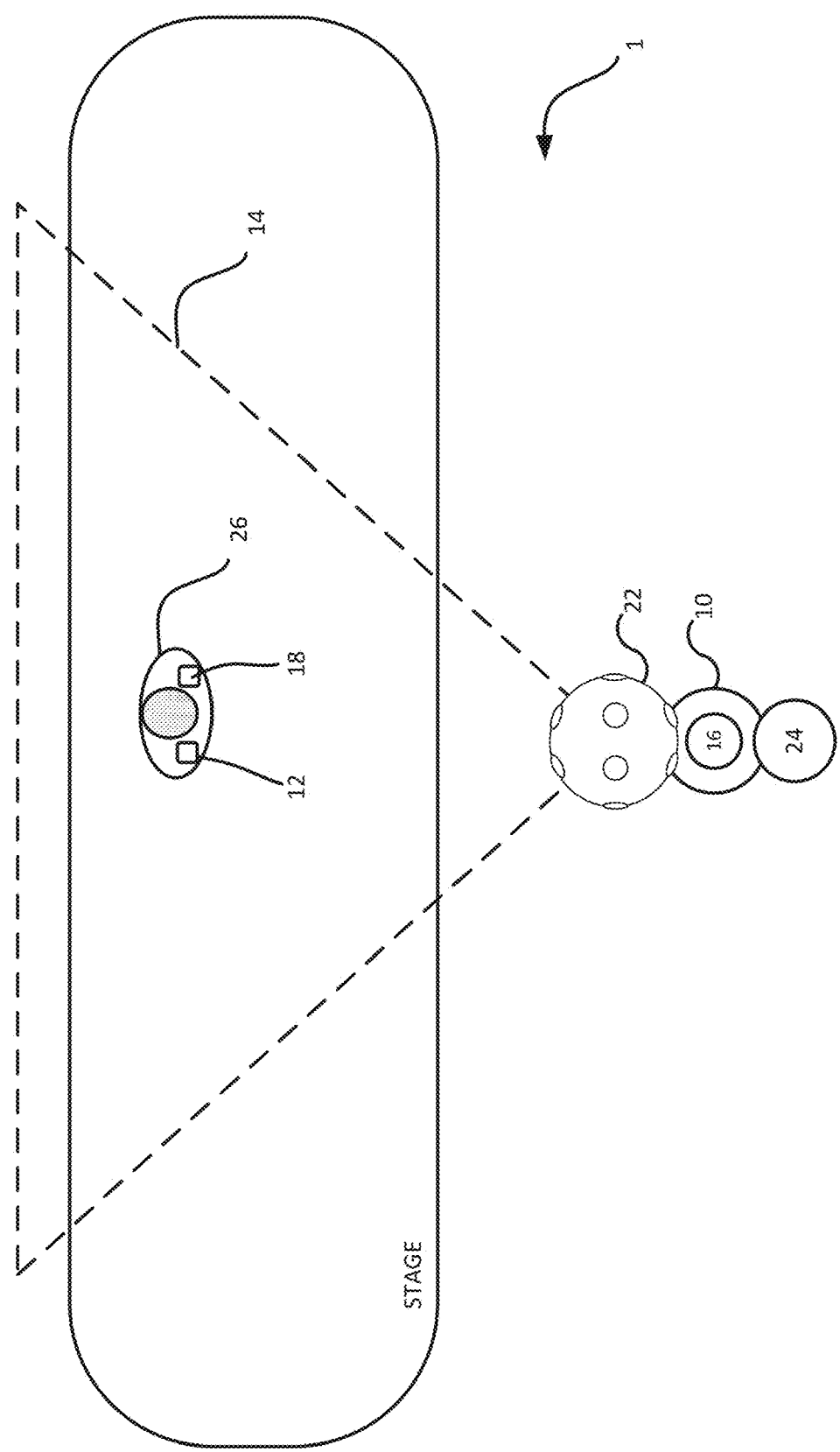
FIG. 1 is a schematic illustration of a system for producing spatial audio.

In the description and drawings, like reference numerals may refer to like elements throughout.

FIG. 1 is a schematic illustration of system 1 for producing spatial audio content. The examples described herein primarily relate to producing spatial audio and also virtual reality (VR) video of actors performing a scene. However, it will be appreciated that the principles described herein may be utilised for implementations in which only audio (and not video) is being captured. Moreover, it will be appreciated that the principles described herein relate to many different scenarios, such as but not limited to recording a musical performance, recording a presenter presenting a TV programme, an interviewer performing an interview.

In the example of FIG. 1, a scene may be recorded using a spatial audio capture system 1. The spatial audio capture system 1 includes a spatial audio mixing (SAM) apparatus 10 configured to associate audio data with the position of a corresponding audio capture device 12. The audio capture device 12 may be, for example, a lavalier microphone. The actor 26 produces audio data during the performance of the scene, which is captured by the microphone 12. However, as will be appreciated, the audio capture device 12 may alternatively be worn or carried by, or otherwise co-located with, an alternative audio source, such as a musical instrument, for example. In any case, the audio capture device 12 is associated with a body 26 which produces audio data.

In the example of FIG. 1, the body 26 is able to move or be moved and, as such, the SAM apparatus 10 may be configured to determine or estimate a position of the body and so also the audio capture device 12. The SAM apparatus 10 may determine or estimate the position of the audio capture device 12 based on a location of a positioning tag 18 associated with the audio capture device 12. For example, the SAM apparatus 10 may comprise a positioning tag 18 such as a radio tag, which is also worn by the actor or other body carrying the audio capture device 12. Additionally, a positioning apparatus 16 is positioned at the location from which the scene is being captured. The positioning apparatus 16 is configured to receive signals from the radio tag 18 in order for the position of the actor and therefore the audio capture device to be determined or estimated. By repeatedly determining the position of the audio capture device it is possible to track the location of the audio capture device as it is moved. In some examples, the position of the tag 18 may be estimated using a system such as Nokia's high-accuracy indoor positioning (HAIP) radio technology which makes use of phased antenna array to estimate the location of a tag based on an angle of arrival of radio signals at the phased antenna array. However, as will of course be appreciated, any suitable mechanism for radio positioning may be used. The positioning apparatus 16 may form part of the SAM apparatus or may simply provide an output (including for instance, estimated positions of one or more radio tags) for use by the SAM apparatus 10.

Radio positioning can be prone to errors for many reasons, such as reflections and occlusions, which may cause the estimated position of the radio tag to be incorrect. In addition, the estimated position may, due to reflections etc., fluctuate around the correct location. If such errors were to occur in the context of SAM, listeners to the spatial audio may hear the audio data captured by the incorrectly tracked audio capture device as originating from the incorrect position which may move, due to the fluctuations, even if the source of the sound did not in fact move during capture of the audio. Moreover, when the spatial audio corresponds to captured video, the users will hear the captured audio at a location which does not match the location of the visual representation of the sound source.

In order to reduce the extent by which the audio may be rendered from an incorrect position, the SAM apparatus 10 is configured to determine whether an estimated position of the audio capture device 12 is within the boundaries of a predetermined area 14, which may be an area within which the audio capture device is expected to be located.

If the SAM apparatus 10 determines that the estimated position of the audio capture device 12 is within the boundaries of a predetermined area 14, then the SAM apparatus 10 responds by associating the audio data from the audio capture device with the estimated position of the audio capture device 12. Accordingly, the captured audio data is associated with the estimated position when the estimated position is determined to be within the boundaries of the predetermined area, thereby to enable the captured audio data to be rendered from the estimated position.

However, if the SAM apparatus 10 determines that the estimated position of the audio capture device 12 is not within the boundaries of the predetermined area 14, then the SAM apparatus 10 responds by associating the captured audio data with an adjusted position, different to the estimated position. Accordingly, the captured audio data is associated with the adjusted position when the estimated position is determined to be outside the boundaries of the predetermined area, thereby to enable the captured audio data to be rendered from the adjusted position.

The position of the audio capture device may be adjusted based on the predetermined area. For instance, the adjusted position may be located within the boundaries of the predetermined area. For example, the adjusted position may be at the centre of the predetermined area, at a boundary of the predetermined area, or at a last estimated position within the predetermined area.

In some examples in which video is being captured concurrently with the spatial audio, the SAM apparatus may respond to a determination that the estimated position of the audio capture device 12 is not within the boundaries of the predetermined area 14 by causing visual detection using video capture apparatus 22 to be enabled within the boundaries of the predetermined area.

The adjusted position may then be set to correspond to a visually detected position of a body associated with the audio capture device. In response to a plurality of bodies being visually detected within the boundaries of the predetermined area, the adjusted position may be set to correspond to the visually detected position of a body which is determined to be closest to the estimated position.

In some examples, the SAM apparatus 10 may be configured to determine a distance between the estimated position and a boundary of the predetermined area, and may set the adjusted position according to the determined distance. For instance, the SAM apparatus 10 may be configured to respond to determining that the distance between the estimated position and the boundary of the predetermined area is less than a predetermined distance by setting the adjusted position to be at the boundary of the predetermined area. If however, the distance is more than the pre-determined distance, the adjusted position may be set elsewhere within the predetermined area.

In some examples, the SAM apparatus 10 or, if for example the rendering is not performed in real time, a separate audio playback apparatus may be configured to cause the captured audio data to be rendered by a spatial audio playback device from a rendering location corresponding to the adjusted position. In some examples, the audio data may be caused to be rendered from a rendering area around the rendering location. Put another way, the perceptual location of the audio may be blurred. The rendering area (i.e. the area over which the sound is blurred) may for instance correspond to one of the whole of the predetermined area and an area surrounding the last estimated position within the predetermined area.

The setting of the boundaries of the predetermined area may be performed in a number of different ways. For instance, the boundaries of the predetermined area may be set according to manual instructions input through a user interface (e.g. but not limited to a touch interface) which is in communication with the SAM apparatus 10. In other examples, the boundaries of the predetermined area may be set based on the one or more gestures of a body detected using a gesture recognition device.

The functionality described in general terms above will now be discussed in more detail with respect to FIGS. 2 to 9.

Figure 2:
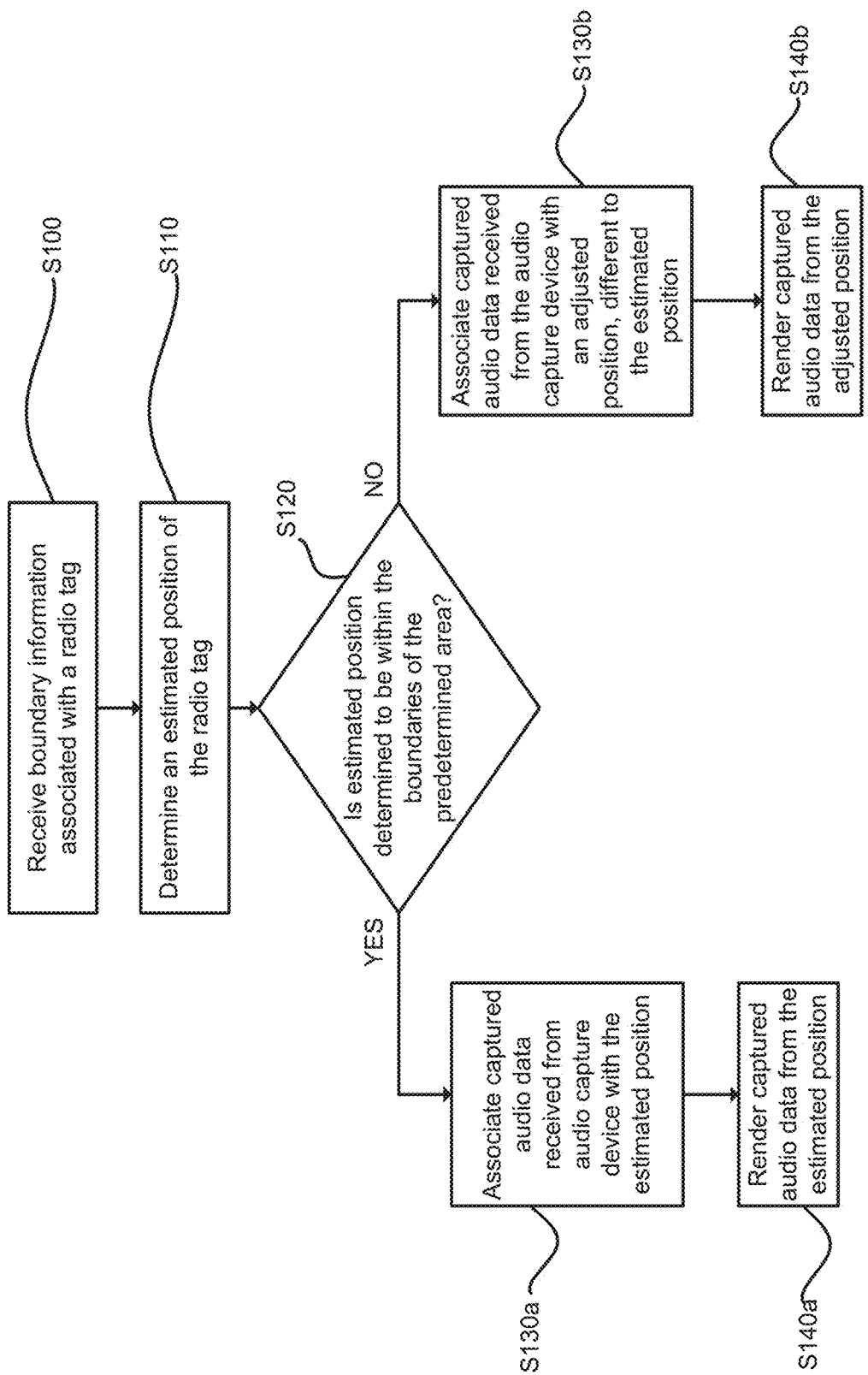
FIG. 2 is a flow chart illustrating an example of operations which may be performed by a spatial audio mixing (SAM) apparatus.

FIG. 2 is a flow chart illustrating various operations which may be performed by the SAM apparatus 10.

In operation S100, the SAM apparatus 10 may receive boundary information specifying the predetermined area which may be associated with a corresponding radio tag. In some example, the received boundary information may already be associated with a particular radio tag, while in others the SAM apparatus may perform the association. In some embodiments, the boundary information may specify a plurality of predetermined areas which may be associated with a plurality of radio tags. The plurality of predetermined areas may be different for one or more of the plurality of radio tags.

In operation S110, the SAM apparatus 10 may determine an estimated position of the radio tag. For instance, the SAM apparatus 10 may estimate the location of, or receive information identifying an estimated location of, the radio tag which corresponds to the predetermined area specified in operation S100. Determining the estimated position may include any suitable signal processing methods to improve accuracy and reliability of the position detection, such as for example, averaging or filtering a plurality of detected positions.

In operation S120 of the SAM apparatus 10 may determine whether the estimated position of the audio capture device 12 which captures audio data is within the boundaries of a predetermined area 14.

If the estimated position is determined to be within the boundaries of the predetermined area, the SAM apparatus may proceed to operation S130a. In operation S130a, the captured audio data is associated with the estimated position of the audio capture device. The association of the captured audio data and the estimated position may include storing in memory information identifying the estimated position at a particular time in association with the audio captured at that time.

However, if it is determined in operation S120, that the estimated position is not within the boundaries of the predetermined area, the SAM apparatus instead proceeds to operation S130b. In operation S130b, the captured audio data is associated with the adjusted position that is different to the estimated position.

At operation S140a following from operation S130a, the method may further involve rendering 3o the captured audio data from the estimated position. Correspondingly, at step S140b following from step S130b, the method may further involve rendering the captured audio data from the adjusted position.

As discussed previously, the spatial audio capture system 1 may also be configured to capture corresponding video content. As such, the system 1 may further include a camera 22 for recording visual data from the scene. The camera 22 is preferably a virtual reality camera which can capture a wide field of view. For instance, the camera may be configured to capture content from a spherical field of view, as is the case with the Nokia's OZO.

Also as discussed previously, the spatial audio capture system 1 may further include a gesture recognition device (GRD) 24. The GRD 24 may include a depth sensing device coupled with gesture recognition software. Alternatively, the GRD 24 may be formed of the camera 22 coupled with gesture recognition software (if the camera 22 is capable of accurately determining depth information). The GRD 24 may be used in order to set virtual boundaries of the predetermined area 14. This is discussed in more detail below with reference to FIG. 3.

Figure 3:
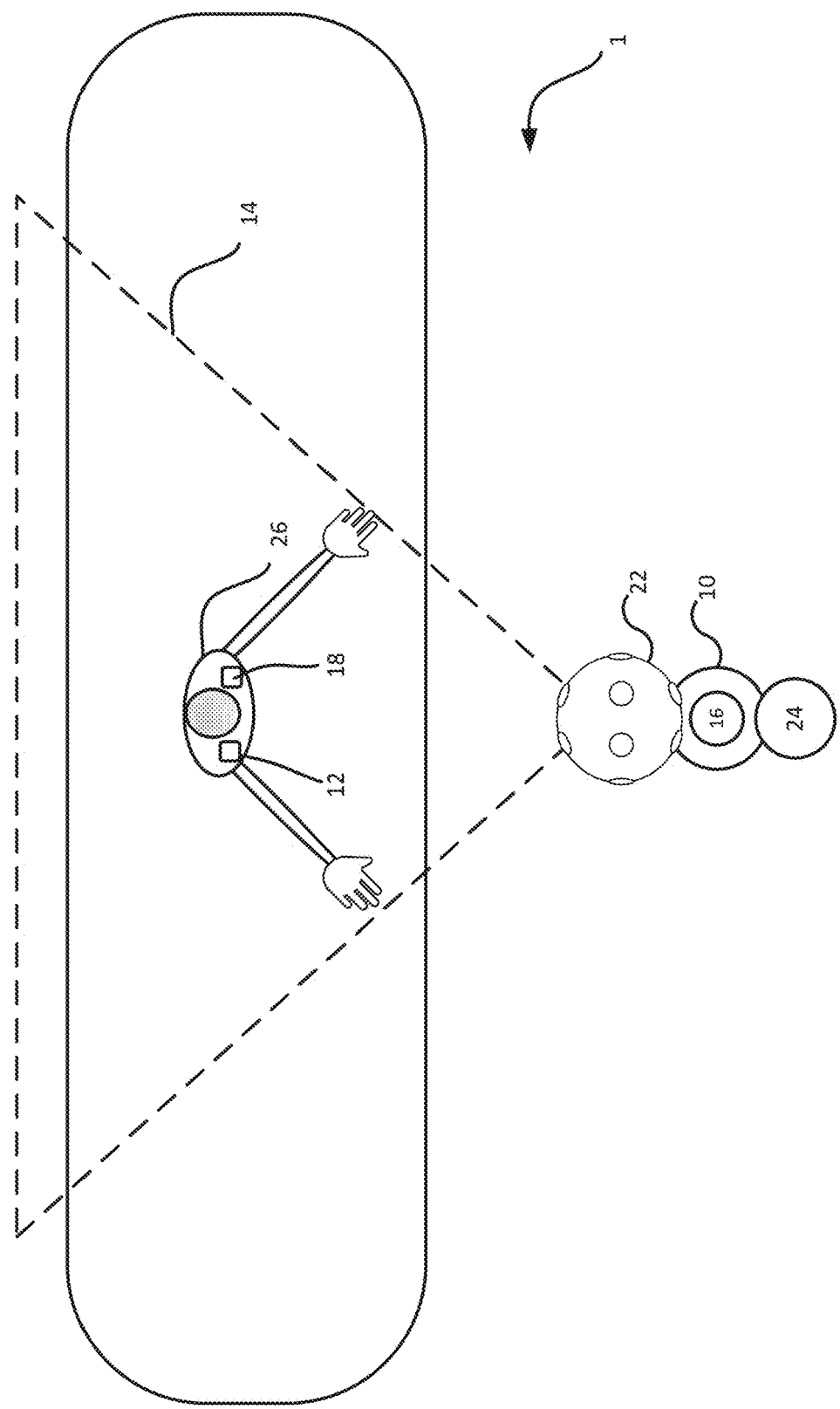
FIG. 3 illustrates an example as to how boundaries of a predetermined area for use by the SAM apparatus may be initiated.

FIG. 3 illustrates how the spatial audio capture system 1 is used to initiate virtual boundaries of the predetermined area 14.

Before the capture of the scene has begun, the boundaries of body carrying the audio capture device 12 (in this case, an actor 26) may be defined. In most cases, the actor 26 knows in advance the area in which he will move during a particular scene that is to be recorded.

As discussed above, in some examples, the boundaries of the predetermined area may be set according to manual instructions input through a user interface of any suitable type. For example, the positioning tag 18 may comprise a button which, when depressed by the actor 26, transmits a signal to the SAM apparatus 10 or the positioning device 16 to indicate the location of a boundary. This can be performed in order to indicate each boundary or corner of the predetermined area 14.

Alternatively, a GRD 24 may be employed to detect one or more gestures of the actor 26 associated with the audio capture device 12. The boundaries of the predetermined area 14 may then be set based on the one or more gestures of the actor 26. Although, in this example, it is the person wearing the audio capture device 12 which performs the gestures, it will be appreciated that in some examples, it may be someone else, for instance prior to the ultimate user of the audio capture device 12 arriving on set.

In order to initiate the boundary definition process, the actor 26 may perform a predefined initiating gesture, such as raising his hands up. The GRD 24 recognises the initiating gesture and starts observing that actor 26 in order to recognise the boundary definitions. The GRD 24 may be configured to give a signal to the actor 26, notifying the actor that it is ready to observe further gestures.

The actor 26 may then define the boundaries by placing their hands at a certain distance from each other and at a relative orientation. The positions and orientation of the boundaries may then be determined based on the position and orientation of the actor's hands.

In the case that the length of the boundary is longer than the actor 26 is able to specify by simultaneously placing their hands in the air, the actor may specify a first boundary location, and then move to specify a second boundary location.

The predetermined area 14 may be a fixed area bounded by virtual boundaries surrounding the predetermined area. Alternatively, the predetermined area may be an angular sector bounded by two lines extending radially from the location from which the scene is being captured and which intersect two respective locations indicated by the actor 26.

The GRD 24 may be configured to communicate with the SAM apparatus 10, in order to notify the SAM apparatus 10 about the boundaries of the predetermined area 14. The GRD 24 may communicate uni-directionally with the SAM apparatus 10.

In some examples, once the boundaries are determined by the actor 26 and detected by the GRD 24, the GRD 24 may associate the boundaries with the corresponding radio tag 18. The GRD 24 may track the position of the actor 26 and record the "skeleton coordinates" of the actor 26. The skeleton coordinates are the coordinates defining the location of the actor as determined by the GRD. The GRD may determine that particular boundaries are associated with a particular radio tag based on the proximity between the radio tag and the skeleton coordinates (with corresponding boundary positions). More specifically, the radio tag which is nearest the skeleton coordinates may be determined to be associated with the corresponding boundaries.

The GRD 24 may then communicate the boundaries associated with the corresponding radio tag 18 to the SAM apparatus 10 as required during the capture of the scene. The SAM apparatus 10 accordingly may consider the specified boundaries as the area from which audio captured by the actor 26 is allowed to be rendered. Accordingly, no audio from the actor 26 will be rendered from outside of the specified predetermined area 14.

Figure 4:
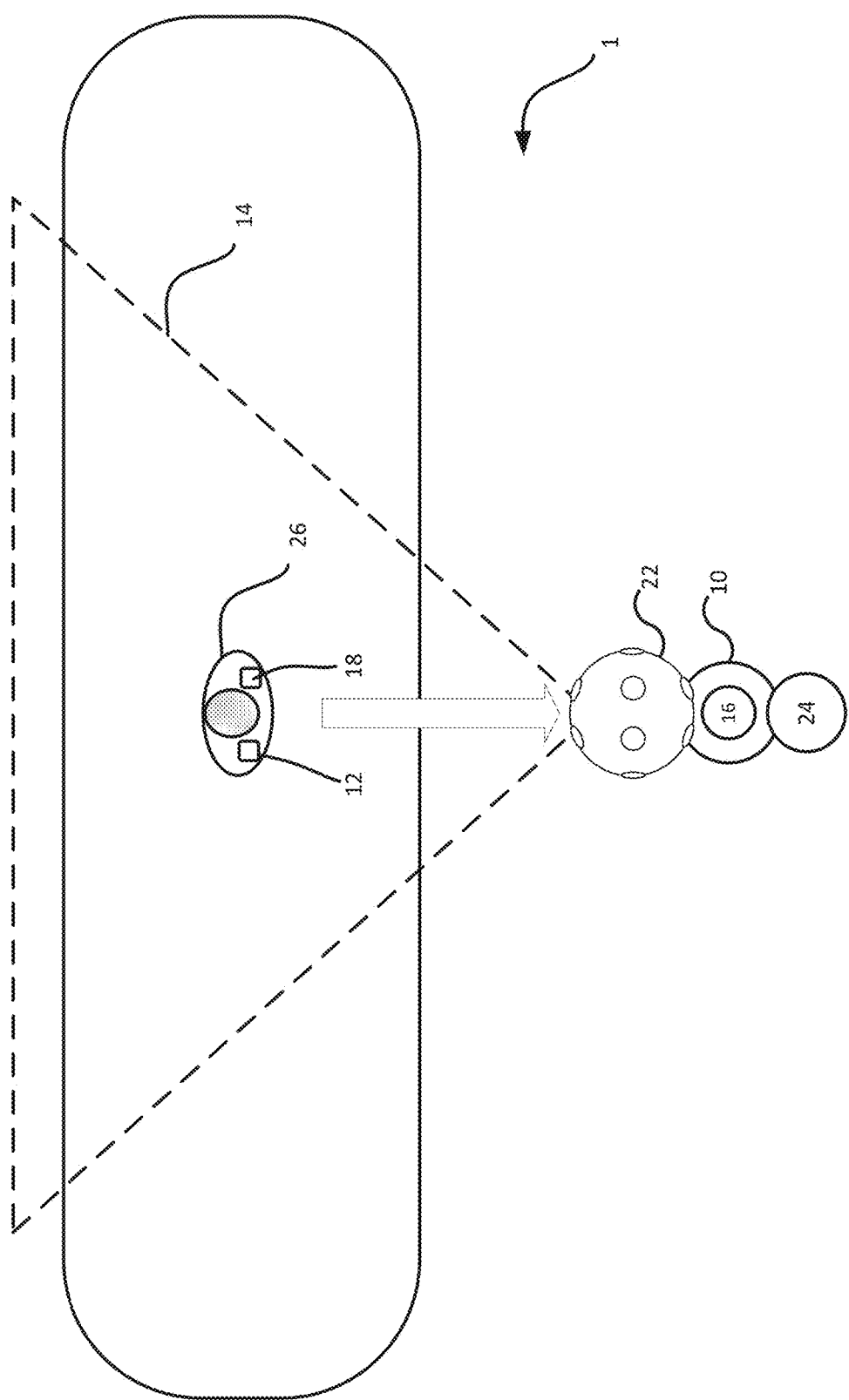
FIG. 4 illustrates captured audio data being rendered from a location within the predetermined area.

As shown with reference to FIG. 4, the SAM apparatus 10 or the positioning apparatus 16 may continuously estimate the position of the radio tag worn by the actor 26 and may associate the captured audio data with the estimated position, thereby to enable the captured audio data to be rendered from the estimated position, as long as the estimated position stays within the boundaries of the predetermined area 14.

Whenever the estimated position is determined to be outside of the boundaries of the predetermined area 14, the SAM apparatus 10 associates the captured audio data with an adjusted position, different to the estimated position. Accordingly, the captured audio data may be rendered from a rendering location corresponding to the adjusted position.

In particular, the adjusted position may be located within the boundaries of the predetermined area. Accordingly, this may avoid the situation in which a user who observes VR A/V content will notice a mismatch between the visually observed position of the actor 26 and the position from which the captured audio data is rendered. For instance, if the estimated position is determined to be outside of the predetermined area 14 due to errors in the radio positioning, the user would, if an adjusted position is not provided, receive audio information from a rendering location located outside of the predetermined area 14. By associating the captured audio data with an adjusted position located within the boundaries of the predetermined area 14 when the estimated position is determined to be outside the boundaries of the predetermined area, the captured audio data may at all times be rendered from a position within the predetermined area 14 within which the actor 26 is located.

The location of the adjusted position may be set in a number of different ways some of which will now be described with reference to FIGS. 5 to 9.

Figure 5:
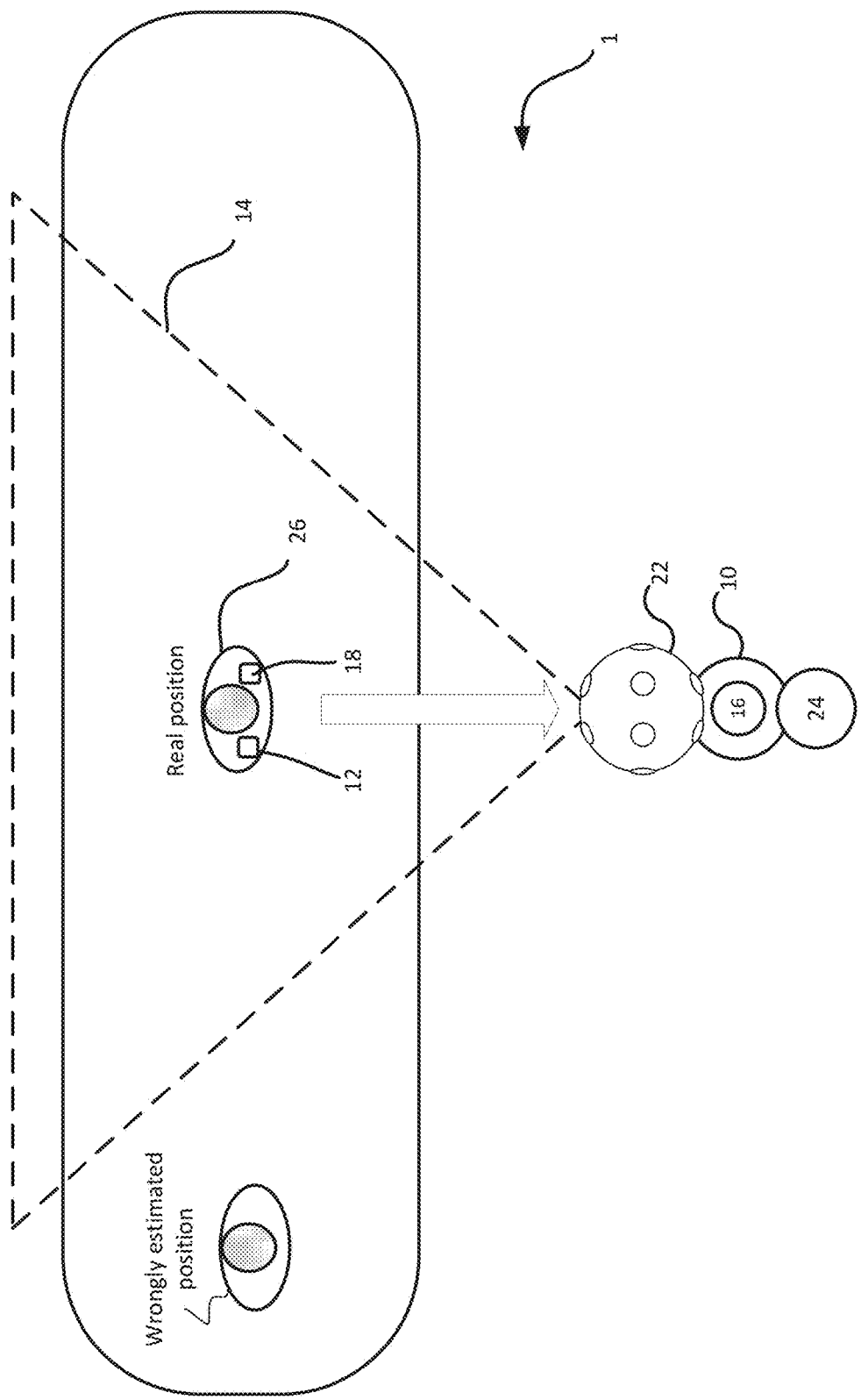
FIG. 5 illustrates an example of setting the adjusted position based on the predetermined area.

FIG. 5 illustrates an example in which the adjusted position is provided at the centre of the predetermined area 14. In such an example, The SAM apparatus 10, when it determines that an estimated position of the audio capture device 12 is not within the boundaries of the predetermined area, associates the captured audio data with an adjusted position located at the centre of the predetermined area 14. Accordingly, the captured audio data may be rendered from a rendering location corresponding to the adjusted position at the centre of the predetermined area 14.

Figure 6:
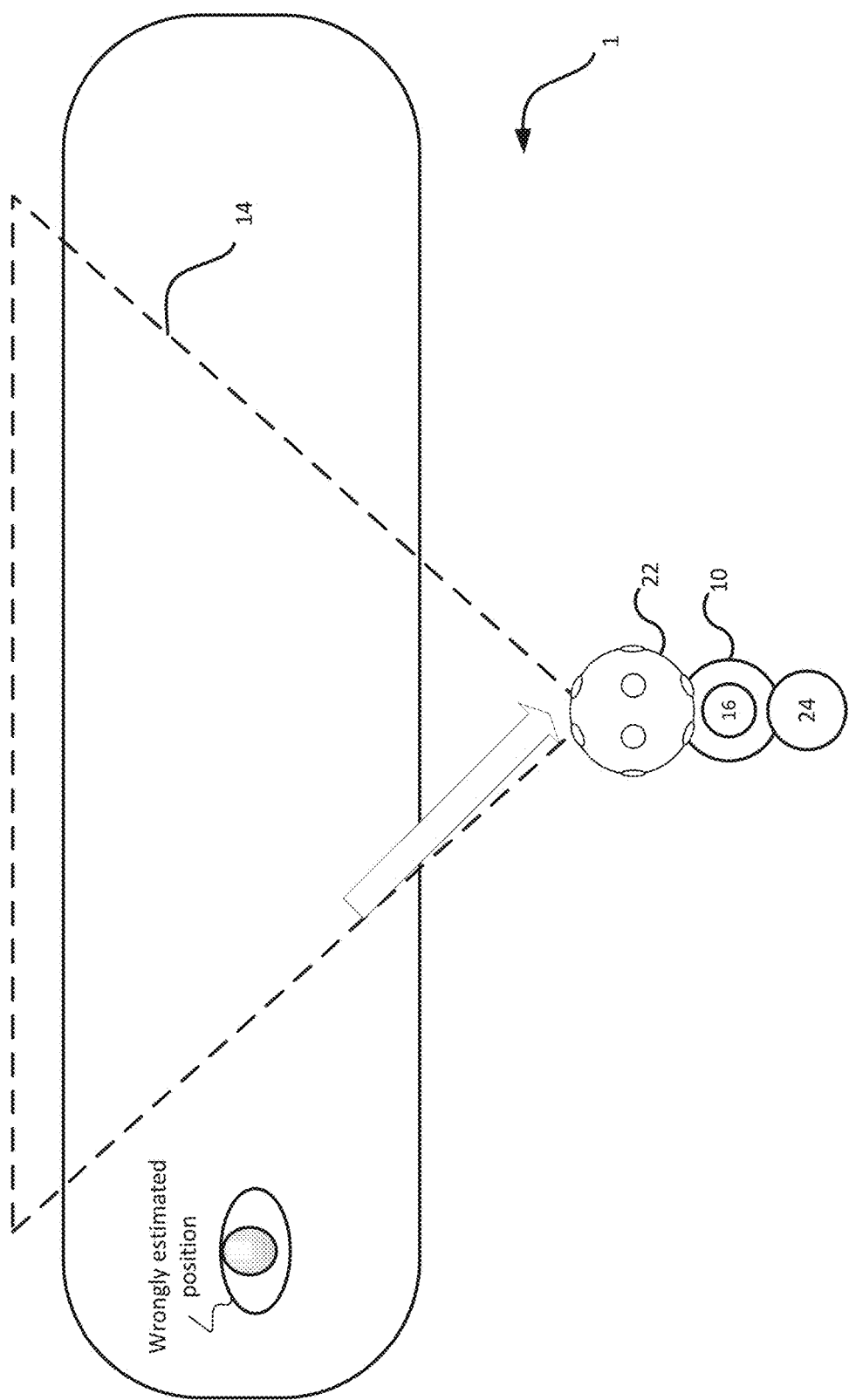
FIG. 6 illustrates another example of setting the adjusted position based on the predetermined area.

FIG. 6 illustrates an example, in which the adjusted position is at the boundary of the predetermined area 14. In this example, when the SAM apparatus 10 determines that an estimated position of the audio capture device 12 is not within the boundaries of the predetermined area, the SAM apparatus associates the captured audio data with an adjusted position located at the boundary of the predetermined area 14. Accordingly, the captured audio data may be rendered from a rendering location corresponding to the adjusted position at the boundary of the predetermined area 14. For example, the adjusted position may be set to be the position on the boundary which is closest to the estimated position.

Figure 7:
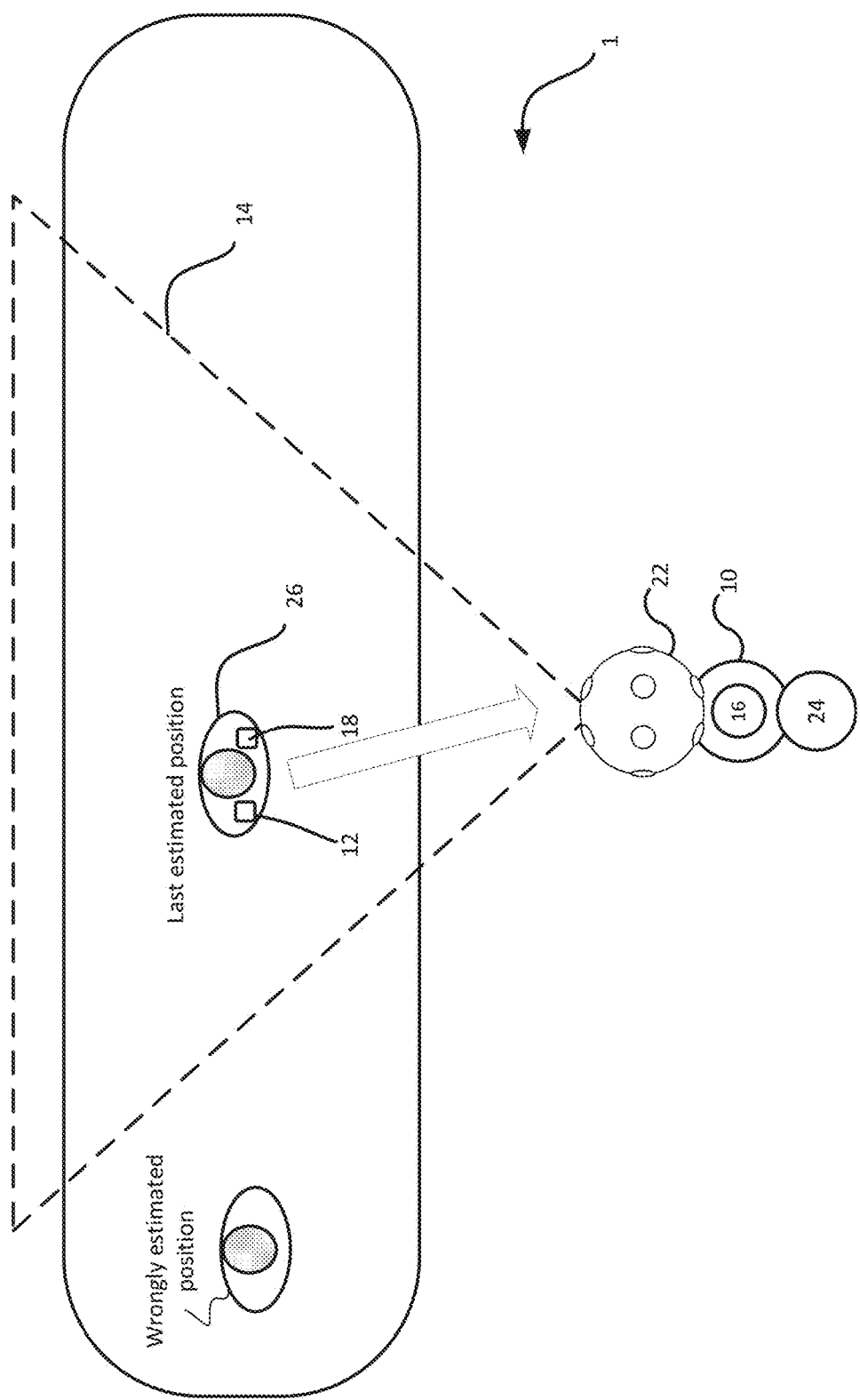
FIG. 7 illustrates yet another example of setting the adjusted position based on the predetermined area.

FIG. 7 illustrates an example in which the adjusted position is at a last estimated position within the predetermined area. In this example, when the SAM apparatus 10 determines that an estimated position of the audio capture device 12 is not within the boundaries of the predetermined area 14, the captured audio data is associated with an adjusted position located at the last estimated position of the audio capture device that was within the predetermined area 14. Accordingly, the captured audio data may be rendered from a rendering location corresponding to the adjusted position at the last estimated position within the predetermined area.

Figure 8:
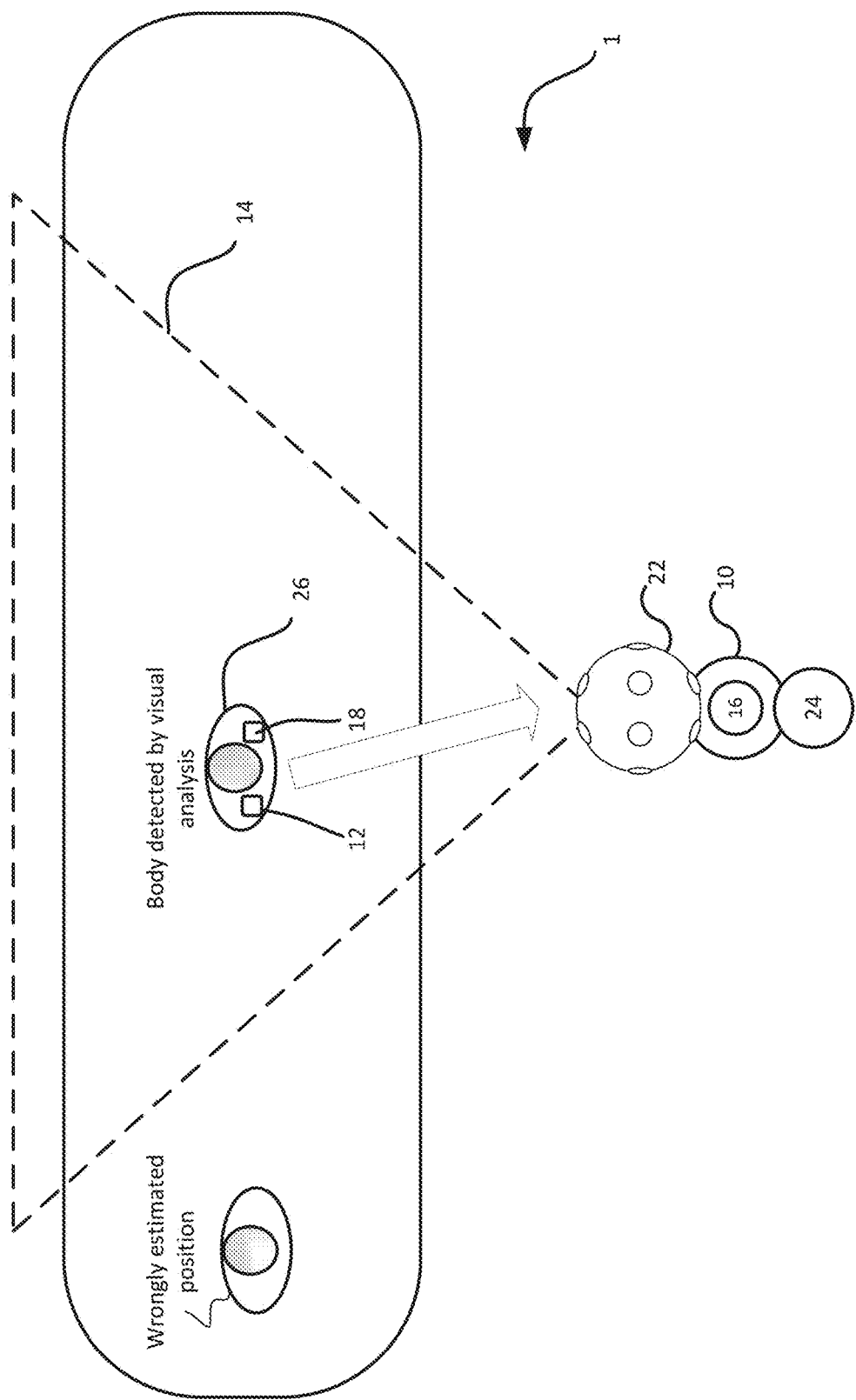
FIG. 8 illustrates yet another example of setting the adjusted position based on the predetermined area.

FIG. 8 illustrates an example in which the adjusted position is set to correspond to a visually detected position of a body 26. In this example, when the SAM apparatus 10 determines that an estimated position of the audio capture device 12 is not within the boundaries of the predetermined area 14, it causes visual detection within the boundaries of the predetermined area 14 to be enabled. The captured audio data is then associated with an adjusted position corresponding to a visually detected position of a body 26 that is within the predetermined area. Accordingly, the captured audio data may be rendered from a rendering location corresponding to the visually detected position. As discussed above, visual detection may involve using the camera 22 to visually detect bodies 26 located within the predetermined area 14. In other examples, the GRD 24 may be used to detect the body/bodies located within the predetermined area. By enabling the computationally intensive visual detection only when the detected position is outside the predetermined area, processing load and power consumption of the SAM apparatus 10 may be decreased.

If there are multiple bodies 26 within the boundaries of the predetermined area 14, then the adjusted position may be set to correspond to the visually detected position of a body which is determined to be closest to the estimated position. Alternatively, visual detection may be enabled periodically when the estimated position is determined to be within the boundaries of the predetermined area. In this case, the body 26 nearest to the radio tag 18 may be visually detected, and the appearance of the body may be associated to that radio tag 18. Accordingly, when the estimated position is determined to be outside the boundaries of the predetermined area, the adjusted position may be set to correspond to the visually detected position of the body 26 whose appearance corresponds to an appearance associated with the radio tag 18.

In some examples, the adjusted position may be selected based on the distance of the estimated position from the boundary. For example, if the SAM apparatus 10 determines that the estimated position is located only a short distance (less than a predetermined distance) outside the boundary, then the adjusted position may be set to a point on the boundary which is closest to the estimated position, as illustrated with respect to FIG. 6. Alternatively, if the estimated position is determined to be a further distance from the boundary, then the adjusted position may be set to an alternative adjusted position, such as at the centre of the predetermined area 14, the last estimated position within the predetermined area 14, or a position corresponding to a visually detected position.

Figure 9:
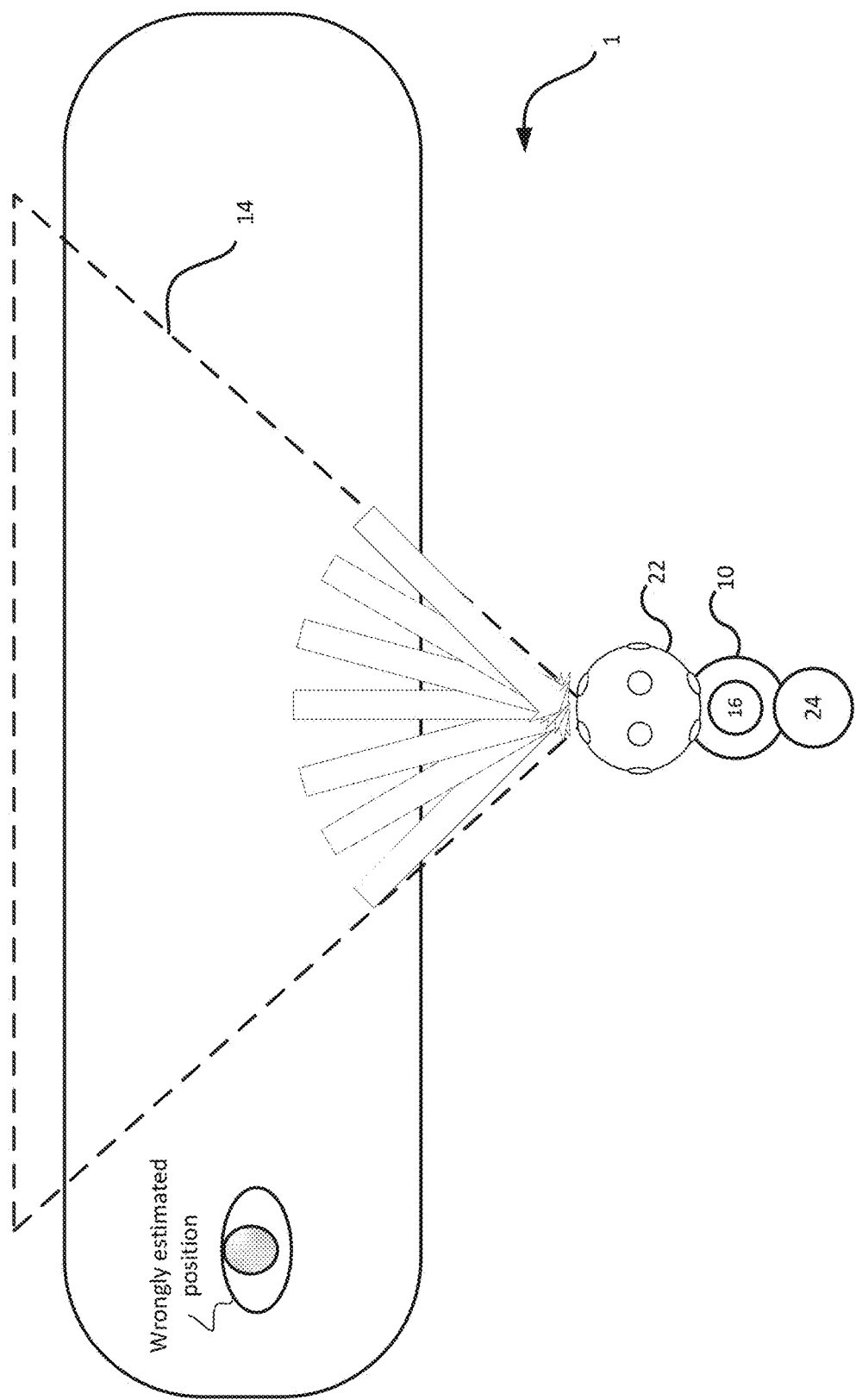
FIG. 9 illustrates an example of captured audio being rendered from an extended rendering area.

Depicted in FIG. 9 is an example as described above in which the captured audio may be rendered from a rendering area around the rendering location. In such examples, the captured audio data may be rendered not from a point location, but from a wider audio area. This may have the effect that the audio is not rendered too precisely, but instead is rendered from an extended, or widened area. As such, the origin of the audio data may be perceived as coming from a general area rather than a precise location. When the location of the audio capture device is not known exactly, it may be preferable from a user experience perspective to "blur" the location of the sounds. This may reduce the chance of a mismatch between a visual position of a sound source and the perceived origin of the sound.

In some such examples, the captured audio data may be rendered from a rendering location corresponding to the whole predetermined area 14. Alternatively, the captured audio data may be rendered from an extended area surrounding the last estimated position determined to be within the boundaries of the predetermined area. Alternatively, the captured audio data may be rendered from an extended area surrounding any of the adjusted positions described with reference to any of claims 5 to 8.

The rendering area may be implemented by use of a Head-Related Transfer Function (HRTF) which characterises the reception of a sound from multiple points instead of just one point, for example from all the points in an area of interest. This can be achieved by modelling a specific HRTF in an anechoic chamber where the audio source may be a distributed source such as an array of loudspeakers, or by just re-applying the same HRTF in multiple points.

Figure 10:
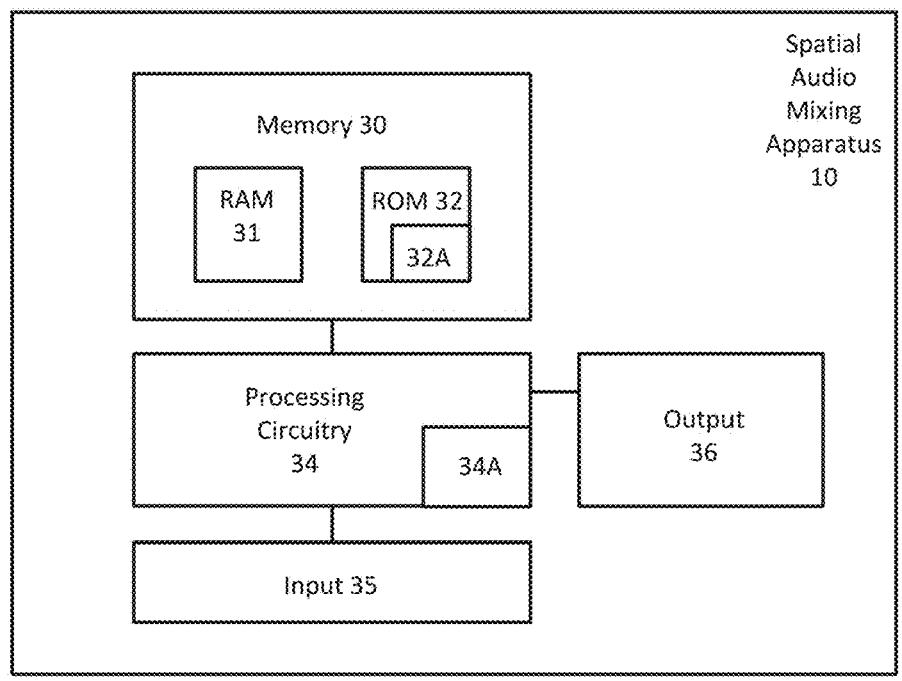
FIG. 10 is a schematic illustration of an example configuration of the SAM apparatus.

FIG. 10 is a schematic block diagram of an example configuration of a SAM apparatus 10 such as described with reference to FIGS. 1 to 9. The SAM apparatus 10 may comprise memory and processing circuitry. The memory 30 may comprise any combination of different types of memory. In the example of FIG. 10, the memory comprises one or more read-only memory (ROM) media (32) and one or more random access memory (RAM) memory media (31). The SAM apparatus may further comprise one or more input interface 35 which may be configured to receive signals from the positioning apparatus 16, the audio capture device 12, the GRD 24, and the camera 22. The processing circuitry 34 may be configured to process the signals received by the input to determine whether an estimated position is within the boundaries of a predetermined area, and to associate captured audio data with the adjusted position if the estimated position is determined to be outside of the boundaries of the predetermined area. The SAM apparatus 10 may further comprise an output interface 36 configured for outputting spatial audio.

Although not shown in FIG. 10, the SAM apparatus 10 may in some examples comprise the positioning apparatus 16. In such examples, one of more of the input interfaces may be configured to receive signals from the radio tag 18 in such a way to enable the position of the radio tag to be estimated.

The memory 30 described with reference to FIG. 10 may have computer readable instructions stored thereon 32A, which when executed by the processing circuitry 34 causes the processing circuitry 34 to cause performance of various ones of the operations described above. The processing circuitry 34 described above with reference to FIG. 10 may be of any suitable composition and may include one or more processors 34A of any suitable type or suitable combination of types. For example, the processing circuitry 34 may be a programmable processor that interprets computer program instructions and processes data. The processing circuitry 34 may include plural programmable processors. Alternatively, the processing circuitry 34 may be, for example, programmable hardware with embedded firmware. The processing circuitry 34 may be termed processing means. The processing circuitry 34 may alternatively or additionally include one or more Application Specific Integrated Circuits (ASICs). In some instances, processing circuitry 34 may be referred to as computing apparatus.

The processing circuitry 34 described with reference to FIG. 10 is coupled to the memory 30 (or one or more storage devices) and is operable to read/write data to/from the memory. The memory may comprise a single memory unit or a plurality of memory units 32 upon which the computer readable instructions 32A (or code) is stored. For example, the memory 30 may comprise both volatile memory (31) and non-volatile memory 32. For example, the computer readable instructions 32A may be stored in the non-volatile memory 32 and may be executed by the processing circuitry 34 using the volatile memory 31 for temporary storage of data or data and instructions. Examples of volatile memory include RAM, DRAM, and SDRAM etc.

Examples of non-volatile memory include ROM, PROM, EEPROM, flash memory, optical storage, magnetic storage, etc. The memories 30 in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 32A described herein with reference to FIG. 10 may be pre-programmed into the SAM apparatus 10. Alternatively, the computer readable instructions 32A may arrive at the SAM apparatus 10 via an electromagnetic carrier signal or may be copied from a physical entity such as a computer program product, a memory device or a record medium such as a CD-ROM or DVD. The computer readable instructions 32A may provide the logic and routines that enable the SAM apparatus 10 to perform the functionalities described above. The combination of computer-readable instructions stored on memory (of any of the types described above) may be referred to as a computer program product.

Figure 11:
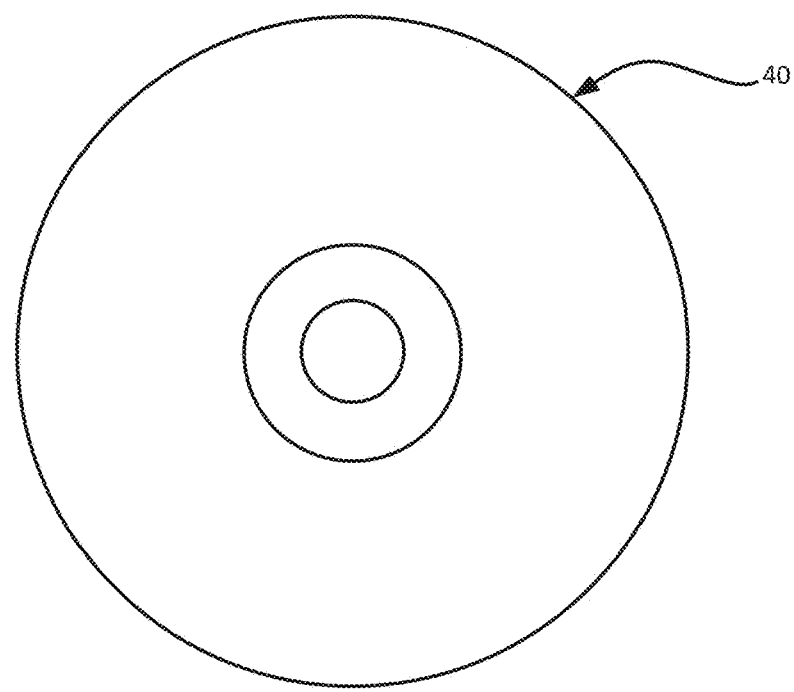
FIG. 11 is a computer-readable memory medium upon which computer readable code may be stored.

FIG. 11 illustrates an example of a computer-readable medium 40 with computer-readable instructions (code) stored thereon. The computer-readable instructions (code), when executed by a processor, may cause any one of or any combination of the operations described above to be performed.

Where applicable, wireless communication capability of the SAM apparatus 10 may be provided by a single integrated circuit. It may alternatively be provided by a set of integrated circuits (i.e. a chipset). The wireless communication capability may alternatively be provided by a hard-wired, application-specific integrated circuit (ASIC). Communication between the apparatuses/devices comprising the VR capture system may be provided using any suitable protocol, including but not limited to a Bluetooth protocol (for instance, in accordance or backwards compatible with Bluetooth Core Specification Version 4.2) or a IEEE 802.11 protocol such as WiFi.

As will be appreciated, the SAM apparatus 10 described herein may include various hardware components which have may not been shown in the Figures since they may not have direct interaction with embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 2 is an example only and that various operations depicted therein may be omitted, reordered and/or combined.

Although various aspects of the invention are set out in the independent claims, other aspects of the invention comprise other combinations of features from the described embodiments and/or the dependent claims with the features of the independent claims, and not solely the combinations explicitly set out in the claims.

As used herein, virtual reality (VR) content may cover, but is not limited to, computer-generated VR content, content captured by a presence capture device such as Nokia's OZO camera or the Ricoh's Theta, and a combination of computer-generated and presence-device captured content. Indeed, VR content may cover any type or combination of types of immersive media (or multimedia) content.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
   determining whether an estimated position of an audio capture device which captures audio data is within boundaries of a predetermined area;
   in response to a determination that the estimated position is not within the boundaries of the predetermined area, causing visual detection to be enabled within the boundaries of the predetermined area, setting the adjusted position to correspond to a visually detected position of a body associated with the audio capture device such that the adjusted position is located within the boundaries of the predetermined area and associating the captured audio data with the adjusted position.

2. A method according to claim 1, wherein the adjusted position is at the centre of the predetermined area.

3. A method according to claim 1, further comprising:
   in response to a plurality of bodies being visually detected within the boundaries of the predetermined area, setting the adjusted position to correspond to the visually detected position of a body which is determined to be closest to the estimated position.

4. A method according to claim 1, further comprising:
   determining a distance between the estimated position and a boundary of the predetermined area, and setting the adjusted position according to the determined distance.

5. A method accordingly to claim 4, further comprising:
   in response to determining that the distance between the estimated position and the boundary of the predetermined area is less than a predetermined distance, setting the adjusted position to be at the boundary of the predetermined area.

6. A method according to claim 1, further comprising:
   causing the captured audio data to be rendered by a spatial audio playback device from a rendering location corresponding to the adjusted position.

7. A method according to claim 6, further comprising:
   causing the audio data to be rendered from a rendering area around the rendering location.

8. A method according to claim 7, wherein the rendering area corresponds to one of: the whole of the predetermined area; or an area surrounding the last estimated position within the predetermined area.

9. Apparatus comprising:
   at least one processor; and
   at least one memory including computer program code, which when executed by the at least one processor, causes the apparatus to determine whether an estimated position of an audio capture device which captures audio data is within boundaries of a predetermined area; and in response to a determination that the estimated position is not within the boundaries of the predetermined area, to cause visual detection to be enabled within the boundaries of the predetermined area, set the adjusted position to correspond to a visually detected position of a body associated with the audio capture device such that the adjusted position is located within the boundaries of the predetermined area and associate the captured audio data with the adjusted position.

10. Apparatus according to claim 9, wherein the adjusted position is at the centre of the predetermined area.

11. Apparatus according to claim 9, wherein, in response to a plurality of bodies being visually detected within the boundaries of the predetermined area, the adjusted position is set to correspond to the visually detected position of a body which is determined to be closest to the estimated position.

12. Apparatus according to claim 9, wherein the computer program code, when executed by the at least one processor, causes the apparatus to determine a distance between the estimated position and a boundary of the predetermined area, and to set the adjusted position according to the determined distance.

13. Apparatus according to claim 12, wherein in response to determining that the distance between the estimated position and the boundary of the predetermined area is less than a predetermined distance, the adjusted position is set to be at the boundary of the predetermined area.

14. Apparatus according to claim 9, wherein the computer program code, when executed by the at least one processor, causes the apparatus to cause the captured audio data to be rendered by a spatial audio playback device from a rendering location corresponding to the adjusted position.

15. Apparatus according to claim 14, wherein the audio is rendered from a rendering area around the rendering location.

16. Apparatus according to claim 15, wherein the rendering area corresponds to one of: the whole of the predetermined area; or an area surrounding the last estimated position within the predetermined area.

17. A non-transitory computer-readable medium having computer-readable code stored thereon, the computer-readable code, when executed by at least one processor, cause performance of at least:
   determining whether an estimated position of an audio capture device which captures audio data is within boundaries of a predetermined area, and in response to a determination that the estimated position is not within the predetermined area, causing visual detection to be enabled within the boundaries of the predetermined area, setting the adjusted position to correspond to a visually detected position of a body associated with the audio capture device such that the adjusted position is located within the boundaries of the predetermined area and associating the captured audio data with the adjusted position.

18. A non-transitory computer-readable medium according to claim 17, wherein the adjusted position is at the centre of the predetermined area.

* * * * *